UNITED STATES PATENT OFFICE.

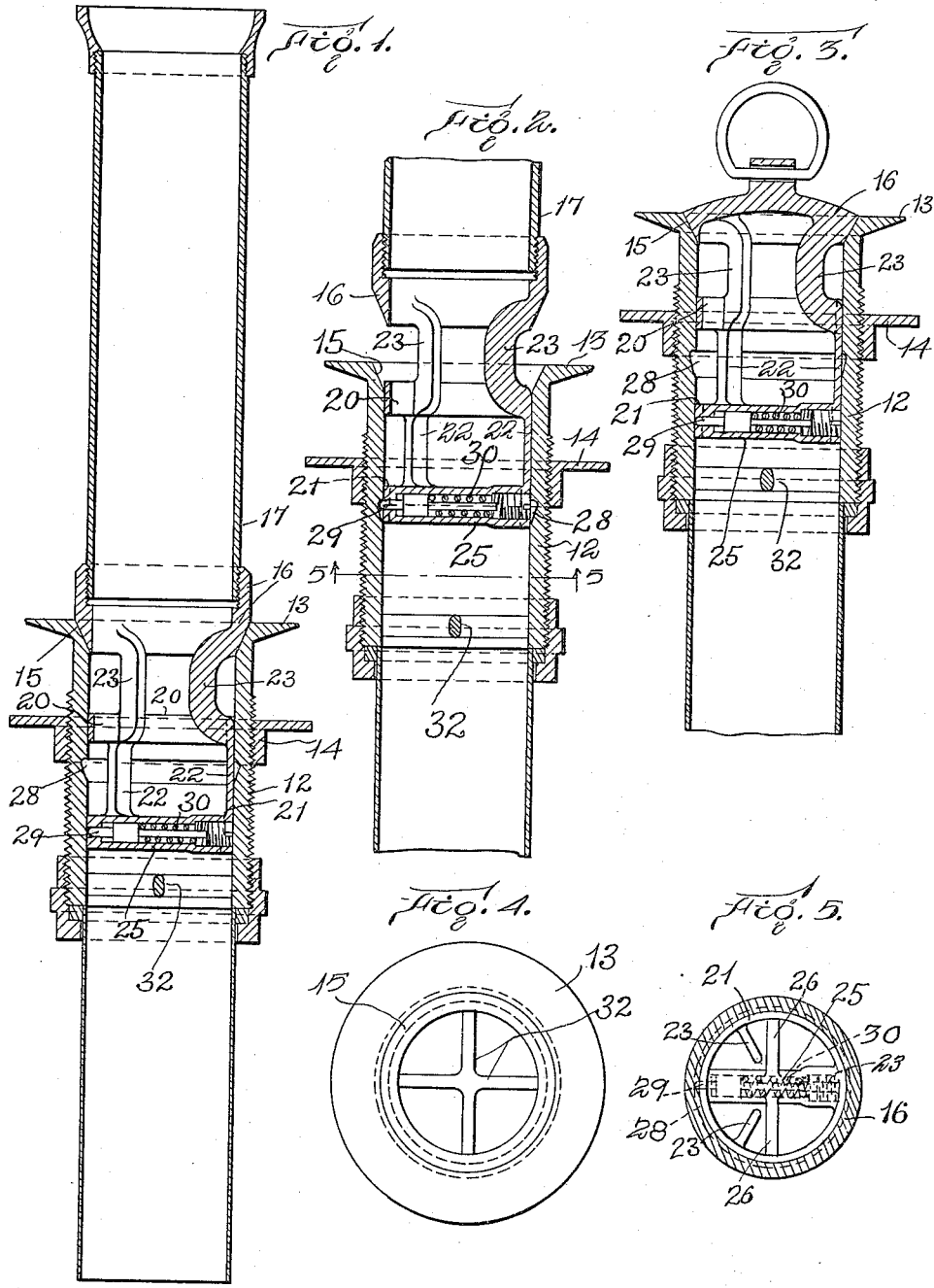

ARTHUR C. BADGER, OF NEWTON CENTER, MASSACHUSETTS.

WASTE-OUTLET AND STOPPER THEREFOR.

1,163,582. Specification of Letters Patent. Patented Dec. 7, 1915.

Application filed February 11, 1915. Serial No. 7,489.

*To all whom it may concern:*

Be it known that I, ARTHUR C. BADGER, a citizen of the United States of America, and a resident of Newton Center, in the county of Middlesex and State of Massachusetts, have invented certain new and useful Improvements in Waste-Outlets and Stoppers Therefor, of which the following is a specification.

This invention relates to waste outlets for bath tubs, bowls and other like receptacles, and is embodied in a waste outlet and a stopper therefor, the stopper being provided with a depending strainer which is movable in and guided by the outlet, so that the stopper when raised is maintained substantially parallel with its seat and is adapted to be maintained in a raised or open position, the strainer being located in the outlet and adapted to intercept foreign matter passing with the water from the receptacle, the stopper and strainer being removable from the outlet so that the arrested matter may be readily removed.

Of the accompanying drawings forming a part of this specification: Figure 1 represents a vertical section of a waste outlet and its stopper embodying my invention, the stopper being closed; Fig. 2 represents a view similar to Fig. 1, showing the stopper open; Fig. 3 represents a view similar to Fig. 1, showing a different form of stopper; Fig. 4 represents an end view of the waste outlet, looking toward the outer end; Fig. 5 represents a section on line 5—5 of Fig. 2, and an end view of the stopper, looking toward the inner end thereof.

The same reference characters indicate the same or similar parts in all the views.

In the drawings, 12 represents a waste pipe adapted to be secured in an opening in the bottom of a liquid receptacle such as a bath tub or set bowl, the pipe as here shown being provided at its upper end with a flange 13 and being externally screw-threaded and provided with a clamping nut 14. At the upper end of the pipe 12 is a seat 15 for the stopper 16. As shown by Figs. 1 and 2, the stopper is of annular form and constitutes the base of a stand or overflow pipe 17 in which water is adapted to overflow. The stopper may be a solid plug, however, as shown by Fig. 3.

From the stopper depends a cage which is movable in and is guided by the pipe 12, said cage having an external bearing on the internal surface of the pipe so that the pipe is adapted to guide the cage and stopper and maintain the stopper substantially parallel with the seat 15 when the stopper is open, as shown by Fig. 2.

The cage is preferably composed of rings 20 and 21, vertical bars 22 connecting said rings, and inwardly curved or offset bars 23 connecting the ring 20 with the stopper 16. The rings and the outer surfaces of the bars 22 are in sliding contact with the internal surface of the pipe 12, so that when the stopper is raised, it cannot tip, but is maintained parallel with the seat 15. The ring 21 forms a part of a grid or strainer adapted to arrest pieces of soap and other foreign matter liable to be carried by the water escaping from the receptacle, the cage being removable from the pipe 12, so that matter arrested by it may be conveniently removed from the outlet pipe with and by the cage, said matter being readily removed from the cage when the latter is withdrawn from the outlet pipe. As here shown, the said grid includes intersecting cross-bars 25 and 26 cast with the ring 20 and relatively arranged as shown by Fig. 5.

The offset connecting bars 23 constitute arresting members adapted to arrest elongated or relatively bulky articles in the escaping water and prevent the same from entering the cage when the stopper is raised, as shown by Fig. 2. Said bars are spaced apart from each other and from the center of the cage, so that water may flow freely between the bars and through the cage.

Friction may be relied upon to hold the cage and stopper in a raised position to permit the emptying of the receptacle, the grid being at the same time held in its operative position within the pipe 12, and the bars or arresting members 23 being held above said pipe. I prefer, however, to provide the pipe 12 and the cage with complemental detent members adapted to coöperate and support the cage and stopper in a raised position. In the embodiment of my invention here shown, the members include an internal groove 28 formed in the inner surface of the pipe 12, and a pin 29 movable in a socket in the cross-bar 25 and pressed by a spring 30 against the inner surface of the pipe 12, the pin being adapted to spring into the groove 28 when the stopper is raised as shown by Fig. 2. The said detent members are yieldingly engaged so that the stopper may be readily pressed downwardly from the position shown by Fig. 2 to close it, and may be moved upwardly from said position to withdraw the cage from the pipe 12. The groove 28 is preferably formed so that its upper side stands at a more pronounced angle with the internal surface of the pipe than its lower side, the upper side of the groove offering a greater resistance to an upward movement of the plug than to a downward movement from the position shown by Fig. 2.

The pipe 12 is preferably provided at its lower end with a grid 32 formed as shown by Fig. 4.

Having described my invention, I claim:

1. An appliance of the character stated, comprising an outlet pipe adapted to be secured to a receptacle and provided with a seat and with a detent member below said seat, and a stopper formed to close on said seat and provided with a depending cage movable in and guided by the outlet pipe, and with a complemental detent member adapted to engage the detent member of the outlet pipe to hold the stopper elevated above the seat and the cage within the outlet pipe, said cage having a grid below the stopper, adapted to retain foreign matter within the cage.

2. An appliance of the character stated, comprising an outlet pipe adapted to be secured to a receptacle and provided with a seat and with a continuous internal groove below said seat, a stopper formed to close on said seat and provided with a depending cage movable in and guided by the outlet pipe, and a spring-pressed pin carried by the cage and adapted to engage said groove to hold the stopper elevated above the seat.

In testimony whereof I have affixed my signature, in presence of two witnesses.

ARTHUR C. BADGER.

Witnesses:
C. F. Brown,
P. W. Pezzetti.

Copies of this patent may be obtained for five cents each, by addressing the "Commissioner of Patents, Washington, D. C."